US011443637B2

(12) United States Patent
Malouf et al.

(10) Patent No.: US 11,443,637 B2
(45) Date of Patent: Sep. 13, 2022

(54) PROXIMITY SENSING SYSTEM AND METHOD FOR A MARINE VESSEL (71) Applicant: Brunswick Corporation, Mettawa, IL (US)

(72) Inventors: Travis C. Malouf, Germantown, WI (US); Aaron J. Ward, Oshkosh, WI (US); Matthew E. Derginer, Butte des Mort, WI (US)

(73) Assignee: Brunswick Corporation, Mettawa, IL (US)

( * ) Notice: Subject to any disclaimer, the term of this patent is extended or adjusted under 35 U.S.C. 154(b) by 420 days.

(21) Appl. No.: 16/674,908

(22) Filed: Nov. 5, 2019

(65) Prior Publication Data
US 2020/0160726 A1 May 21, 2020

Related U.S. Application Data (60) Provisional application No. 62/770,513, filed on Nov. 21, 2018.

(51) Int. Cl.
*G08G 3/02* (2006.01)
*B63B 49/00* (2006.01)
(Continued)

(52) U.S. Cl.
CPC .............. *G08G 3/02* (2013.01); *B63B 49/00* (2013.01); *B63H 25/04* (2013.01); *G05D 1/0206* (2013.01)

(58) Field of Classification Search
CPC .......... G08G 3/02; B63B 49/00; B63H 25/04; G05D 1/0206
(Continued)

(56) References Cited

U.S. PATENT DOCUMENTS 5,515,287 A 5/1996 Hakoyama et al.
6,234,100 B1 5/2001 Fadeley et al.
(Continued)

FOREIGN PATENT DOCUMENTS

CA 2279165 1/2001
CA 2282064 1/2001
(Continued)

OTHER PUBLICATIONS

European search report dated Feb. 21, 2020 in counterpart European Patent Application 19210023.8.
(Continued)

*Primary Examiner* — Tyler J Lee
*Assistant Examiner* — Tiffany P Ohman
(74) *Attorney, Agent, or Firm* — Andrus Intellectual Property Law, LLP (57) ABSTRACT A proximity sensor system on a marine vessel includes one or more proximity sensors, each at a sensor location on the marine vessel and configured to measure proximity of objects and generate proximity measurements. A processor is configured to store a two-dimensional vessel outline of the marine vessel with respect to a point of navigation for the marine vessel, receive the proximity measurements measured by one or more proximity sensors on the marine vessel, and identify four linearly-closest proximity measurements to the two-dimensional vessel outline, including one closest proximity measurement in each of a positive X direction, a negative X direction, a positive Y direction, and a negative Y direction. The processor then generates a most important object (MIO) dataset identifying the four linearly-closest proximity measurements.

20 Claims, 7 Drawing Sheets (51) Int. Cl.
*B63H 25/04* (2006.01)
*G05D 1/02* (2020.01)

(58) Field of Classification Search
USPC .......................................................... 701/21
See application file for complete search history.

(56) References Cited

U.S. PATENT DOCUMENTS

| | | |
|---|---|---|
| 6,273,771 B1 | 8/2001 | Buckley et al. |
| 7,267,068 B2 | 11/2007 | Bradley et al. |
| 7,725,253 B2 | 5/2010 | Foxlin |
| 8,195,381 B2 | 6/2012 | Arvidsson |
| 8,622,778 B2 | 1/2014 | Tyers et al. |
| 9,039,469 B1 | 5/2015 | Calamia et al. |
| 9,183,711 B2 | 11/2015 | Fiorini et al. |
| 9,355,463 B1 | 5/2016 | Arambel et al. |
| 9,615,006 B2 | 4/2017 | Terre et al. |
| 9,650,119 B2 | 5/2017 | Morikami et al. |
| 9,729,802 B2 | 8/2017 | Frank et al. |
| 9,734,583 B2 | 8/2017 | Walker et al. |
| 9,778,657 B2 | 10/2017 | Tyers |
| 9,878,769 B2 | 1/2018 | Kinoshita et al. |
| 9,996,083 B2 | 1/2018 | Vojak |
| 9,908,605 B2 | 3/2018 | Hayashi et al. |
| 9,927,520 B1 | 3/2018 | Ward et al. |
| 9,988,134 B1 | 6/2018 | Gable et al. |
| 10,037,701 B2 | 7/2018 | Harnett |
| 10,048,690 B1 | 8/2018 | Hilbert et al. |
| 10,055,648 B1 | 8/2018 | Grigsby et al. |
| 10,106,238 B2 | 10/2018 | Sidki et al. |
| 10,126,748 B2 | 11/2018 | Akuzawa et al. |
| 10,191,153 B2 | 1/2019 | Gatland |
| 10,191,490 B2 | 1/2019 | Akuzawa et al. |
| 10,431,099 B2 | 1/2019 | Stewart et al. |
| 10,281,917 B2 | 5/2019 | Tyers |
| 10,338,800 B2 | 7/2019 | Rivers et al. |
| 10,429,845 B2 | 10/2019 | Arbuckle et al. |
| 10,444,349 B2 | 10/2019 | Gatland |
| 10,507,899 B2 | 12/2019 | Imamura et al. |
| 2003/0137445 A1 | 7/2003 | Rees et al. |
| 2005/0075016 A1 | 4/2005 | Bertetti et al. |
| 2006/0058929 A1 | 3/2006 | Fossen et al. |
| 2007/0089660 A1 | 4/2007 | Bradley et al. |
| 2011/0153125 A1 | 6/2011 | Arbuckle et al. |
| 2011/0172858 A1 | 7/2011 | Gustin et al. |
| 2014/0316657 A1 | 10/2014 | Johnson et al. |
| 2015/0009325 A1 | 1/2015 | Kardashov |
| 2015/0032305 A1 | 1/2015 | Lindeborg |
| 2015/0089427 A1 | 3/2015 | Akuzawa |
| 2015/0134146 A1 | 5/2015 | Pack et al. |
| 2015/0172545 A1 | 6/2015 | Szabo et al. |
| 2015/0276923 A1 | 10/2015 | Song et al. |
| 2015/0288891 A1 | 10/2015 | Johansson et al. |
| 2015/0294660 A1 | 10/2015 | Stokes et al. |
| 2015/0375837 A1 | 12/2015 | Johnson et al. |
| 2015/0378361 A1 | 12/2015 | Walker et al. |
| 2016/0041039 A1 | 2/2016 | Olsson |
| 2016/0069681 A1 | 3/2016 | Johnson et al. |
| 2016/0070265 A1 | 3/2016 | Liu et al. |
| 2016/0125739 A1 | 5/2016 | Stewart et al. |
| 2016/0162145 A1 | 6/2016 | Rivers et al. |
| 2016/0187140 A1 | 6/2016 | Clarke et al. |
| 2016/0196653 A1 | 7/2016 | Grant et al. |
| 2016/0214534 A1 | 7/2016 | Richards et al. |
| 2016/0334794 A1 | 7/2016 | Johnson et al. |
| 2016/0370187 A1 | 12/2016 | Gatland et al. |
| 2017/0059705 A1 | 3/2017 | Stokes et al. |
| 2017/0064238 A1 | 3/2017 | Kardashov |
| 2017/0090021 A1 | 3/2017 | Sayer et al. |
| 2017/0146642 A1 | 5/2017 | Stokes et al. |
| 2017/0167871 A1 | 6/2017 | Johnson et al. |
| 2017/0168159 A1 | 6/2017 | Gatland |
| 2017/0176586 A1 | 6/2017 | Johnson et al. |
| 2017/0184414 A1 | 6/2017 | Johsnon et al. |
| 2017/0205829 A1 | 7/2017 | Tyers |
| 2017/0227639 A1 | 8/2017 | Stokes et al. |
| 2017/0243360 A1 | 8/2017 | Schulte |
| 2017/0253314 A1* | 9/2017 | Ward ..................... B63H 25/04 |
| 2017/0277189 A1 | 9/2017 | Johnson et al. |
| 2017/0285134 A1 | 10/2017 | Stokes et al. |
| 2017/0300056 A1 | 10/2017 | Johnson et al. |
| 2017/0365175 A1 | 12/2017 | Harnett |
| 2017/0371348 A1 | 12/2017 | Mou |
| 2018/0004209 A1* | 1/2018 | Akuzawa ............... B63H 25/46 |
| 2018/0023954 A1 | 1/2018 | Rivers |
| 2018/0050772 A1 | 2/2018 | Koyano et al. |
| 2018/0057132 A1 | 3/2018 | Ward et al. |
| 2018/0081054 A1 | 3/2018 | Rudzinsky et al. |
| 2018/0259338 A1 | 9/2018 | Stokes et al. |
| 2018/0259339 A1 | 9/2018 | Johnson et al. |
| 2018/0292529 A1 | 10/2018 | Hogasten |
| 2019/0098212 A1 | 3/2019 | Shain et al. |
| 2019/0137618 A1 | 5/2019 | Hawker |
| 2019/0251356 A1 | 8/2019 | Rivers |
| 2019/0258258 A1 | 8/2019 | Tyers |
| 2019/0283855 A1 | 9/2019 | Nilsson |
| 2020/0042004 A1* | 2/2020 | Fujiyama ............. G05D 1/0206 |

FOREIGN PATENT DOCUMENTS

| | | |
|---|---|---|
| DE | 11 2013 004908 | 6/2015 |
| EP | 1 775 212 | 4/2007 |
| EP | 1873052 A2 | 1/2008 |
| EP | 3 182 155 | 6/2017 |
| EP | 2824528 | 3/2019 |
| JP | 7-246998 | 10/1999 |
| JP | 2016049903 | 4/2016 |
| JP | 2017178242 | 10/2017 |
| KR | 20140011245 | 1/2014 |
| WO | 9305406 | 3/1993 |
| WO | 2006040785 A1 | 4/2006 |
| WO | 2006 062416 | 6/2006 |
| WO | 2008 066422 | 6/2008 |
| WO | 2012010818 | 1/2012 |
| WO | 2017 095235 | 6/2017 |
| WO | 2017167905 | 10/2017 |
| WO | 2017168234 A1 | 10/2017 |
| WO | 2018162933 | 9/2018 |
| WO | 2018183777 | 10/2018 |
| WO | 2018201097 | 11/2018 |
| WO | 2018232376 | 12/2018 |
| WO | 2018232377 | 12/2018 |
| WO | 2018232377 A1 | 12/2018 |
| WO | 2019011451 | 1/2019 |
| WO | 2019096401 | 5/2019 |
| WO | 2019126755 | 6/2019 |
| WO | 2019157400 | 8/2019 |
| WO | 2019201945 | 10/2019 |

OTHER PUBLICATIONS

Translation of reasons for rejection dated Apr. 14, 2020 in counterpart Japan Patent Application 2019-207442.
European Office Action dated Mar. 16, 2021 in counterpart European Patent Application 19210023.8.
John Bayless, Adaptive Control of Joystick Steering in Recreational Boats, Marquette University, Aug. 2017, https://epublications.marquette.edu/cgi/viewcontent.cgi?article=1439&context=theses_open.

* cited by examiner

PROXIMITY SENSING SYSTEM AND METHOD FOR A MARINE VESSEL

FIELD

The present disclosure generally relates to systems and methods for proximity sensing on a marine vessel, and more specifically to proximity sensing systems and methods that implement a simplified vessel shape to intelligently categorize and prioritize proximity measurement data and provide a proximity sensing system for use in autonomous or semi-autonomous vessel control.

BACKGROUND

The following U.S. Patents are incorporated herein by reference, in entirety:

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station-keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Patent Application Publication No. 2018/0057132 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

SUMMARY

In one embodiment, a proximity sensor system on a marine vessel includes one or more proximity sensors, each at a sensor location on the marine vessel and configured to measure proximity of objects and generate proximity measurements. A processor is configured to store a two-dimensional vessel outline of the marine vessel with respect to a point of navigation for the marine vessel, receive the proximity measurements measured by one or more proximity sensors on the marine vessel, and identify four linearly-closest proximity measurements to the two-dimensional vessel outline, including one closest proximity measurement in each of a positive X direction, a negative X direction, a positive Y direction, and a negative Y direction. The processor then generates a most important object (MIO) dataset identifying the four linearly-closest proximity measurements. In certain embodiments, the system may be further configured to identify two rotationally-closest proximity measurements to the two-dimensional vessel outline such that the MIO dataset further includes the smallest positive yaw angle and a smallest negative yaw angle. For example, the smallest positive yaw angle between one of the proximity measurements and an intersection point on a starboard side of the two-dimensional vessel outline and the smallest negative yaw angle between one of the proximity measurements and an intersection point on a port side of the two-dimensional vessel outline.

In one embodiment, a method of operating a proximity sensor system on a marine vessel includes defining a two-dimensional vessel outline of the marine vessel with respect to a point of navigation for the marine vessel and storing the two-dimensional vessel outline of the marine vessel in a memory accessible to a processor. When proximity measurements measured by one or more proximity sensors on the marine vessel are received at the processor, the proximity measurements are translated to a common reference frame with respect to the point of navigation for the marine vessel, and then the four linearly-closest proximity measurements to the two-dimensional vessel outline are identified, including one closest proximity measurement in each of a positive X direction, a negative X direction, a positive Y direction, and a negative Y direction. A most important object (MIO) dataset is then generated that identifies the four linearly-closest proximity measurements. In certain embodiments, the method may further include identifying two rotationally-closest proximity measurements to the two-dimensional vessel outline for inclusion in the MIO dataset. The rotationally-closest proximity measurements may be, for example, a smallest positive yaw angle between one of the proximity measurements and an intersection point on a starboard side of the two-dimensional vessel outline and a smallest negative yaw angle between one of the proximity measurements and an intersection point on a port side of the two-dimensional vessel outline.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
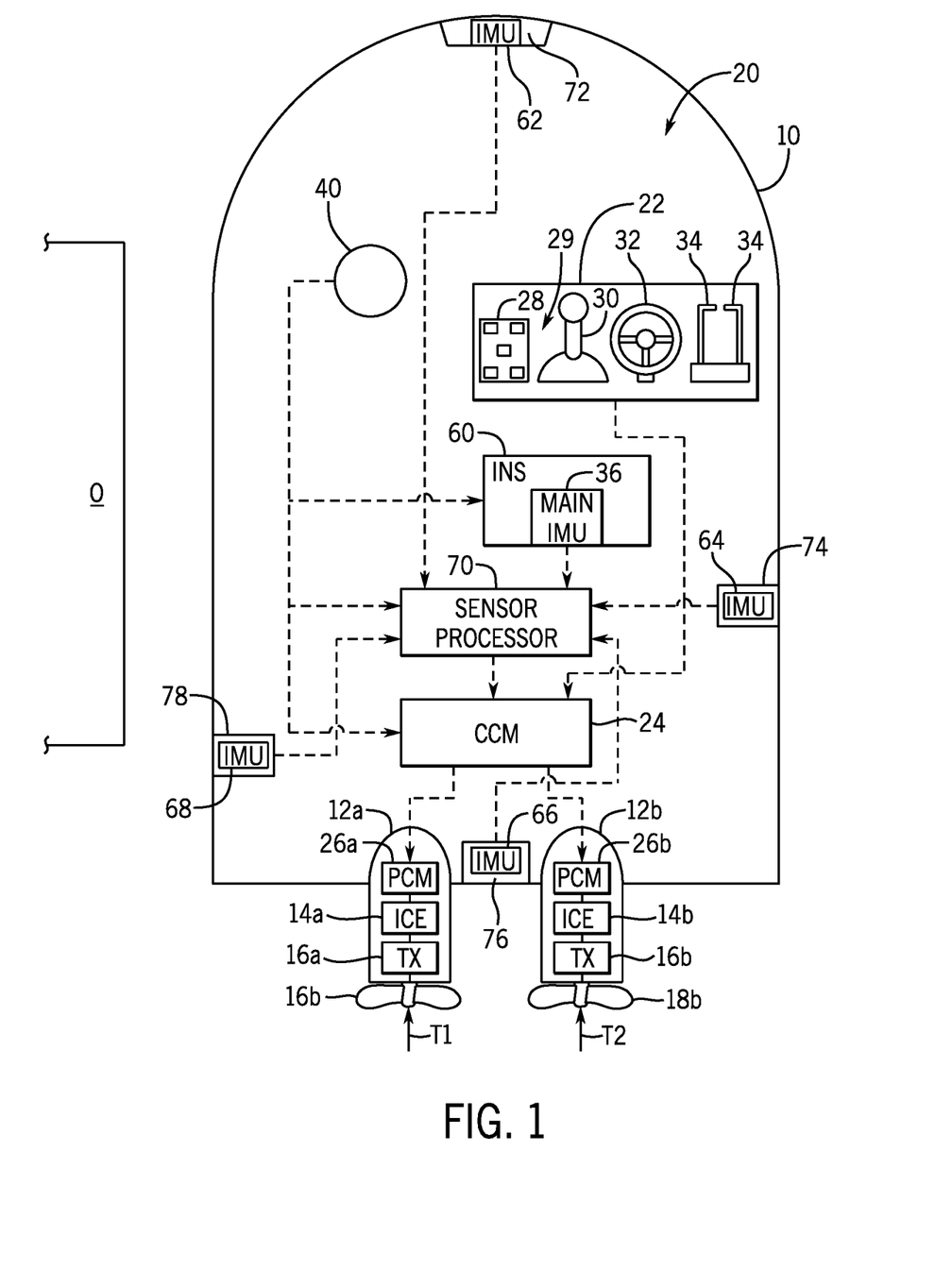
FIG. 1 is a schematic representation of an exemplary propulsion system on a marine vessel.

FIG. 1 shows a marine vessel 10 equipped with a propulsion control system 20 on a marine vessel 10 configured according to one embodiment of the disclosure. The propulsion control system 20 is capable of operating, for example, in a joysticking mode where a joystick is operated by a user to control vessel movement within an x/y plane, among other modes, as described hereinbelow. The propulsion system 20 has first and second propulsion devices 12a, 12b that produce first and second thrusts T1, T2 to propel the vessel 10. The first and second propulsion devices 12a, 12b are illustrated as outboard motors, but they could alternatively be inboard motors, stern drives, jet drives, or pod drives. Each propulsion device is provided with an engine 14a, 14b operatively connected to a transmission 16a, 16b, in turn, operatively connected to a propeller 18a, 18b.

The vessel 10 also houses various control elements that comprise part of the propulsion control system 20. The system 20 comprises an operation console 22 in signal communication, for example via a CAN bus as described in U.S. Pat. No. 6,273,771, with a controller 24, such as for example a command control module (CCM), and with propulsion control modules (PCM) 26a, 26b associated with the respective propulsion devices 12a, 12b. Each of the controller 24 and the PCMs 26a, 26b may include a memory 25a and a programmable processor 25b. As is conventional, each control module 24, 26a, 26b includes a processor communicatively connected to a storage system comprising a computer-readable medium that includes volatile or non-volatile memory upon which computer readable code and data is stored. The processor can access the computer readable code and, upon executing the code, carries out functions, such as the proximity sensing and data processing functions for purposes of navigation control, as described in detail below.

The operation console 22 includes a number of user input devices, such as a keypad 28, a joystick 30, a steering wheel 32, and one or more throttle/shift levers 34. Each of these devices inputs commands to the controller 24. The controller 24, in turn, communicates control instructions to the first and second propulsion devices 12a, 12b by communicating with the PCMs 26a, 26b. The steering wheel 32 and the throttle/shift levers 34 function in a conventional manner, such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide signals to the controller 24. The joystick 30 can be used to allow the operator of the vessel 10 to manually maneuver the vessel 10, such as to achieve lateral translation or rotation of the vessel 10.

The propulsion control system 20 also includes one or more proximity sensors 72, 74, 76, and 78. Although one proximity sensor is shown on each of the bow, stern, and port and starboard sides of the vessel 10, fewer or more sensors could be provided at each sensor location and/or provided at other sensor locations, such as on the hardtop of the vessel 10. The proximity sensors 72-78 are distance and directional sensors. For example, the sensors could be radars, sonars, cameras, lasers (e.g. lidars or Leddars), Doppler direction finders, or other devices individually capable of determining both the distance and direction (at least approximately), i.e. the relative position of an object O with respect to the vessel 10, such as a dock, a seawall, a slip, another vessel, a large rock or tree, etc. The sensors 72-78 provide information regarding both a direction of the object with respect to the marine vessel 10 and a shortest distance between the object O and the vessel 10. Alternatively, separate sensors could be provided for sensing direction than are provided for sensing distance, or more than one type of distance/direction sensor can be provided at a single sensor location on the vessel 10. The sensors 72-78 provide this distance and/or direction information to one or more control modules, such as to the sensor processor 70 and/or the control module 24, such as by way of a dedicated bus connecting the sensors to a controller, a CAN bus, or wireless network transmissions, as described in more detail below.

Regarding the proximity sensors, 72, 74, 76, 78, note that different types of sensors may be used depending on the distance between the vessel 10 and the object O. For example, one or more radar or lidar sensor(s) may be used to detect objects at further distances. Once the vessel 10 comes within a particular distance of the object, ultrasonic, lidar, Leddar, or sonar sensors may instead be used. Camera sensors may be used, alone or in combination with any of the sensors mentioned above, in order to provide object proximity information to the control module 24. Sensors are placed at sensor locations on the vessel 10 so that they are at the correct height and facing direction to detect objects the vessel 10 is likely to encounter. Optimal sensor locations and positions will vary depending on vessel size and configuration.

In FIG. 1, the proximity sensors are positioned at each of the front, sides, and stern of the vessel 10, and include front-facing sensor 72, starboard-facing sensor 74, rear-facing sensor 76, and port-facing sensor 78. In a different exemplary sensor arrangement, two proximity sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and cameras) to sense the shortest distance and the direction of the object with respect to the vessel 10. Alternatively, the sensor processor may use all available sensor data from all sensor types, which may be reviewed real time as it is received or may be formulated into one or more maps or occupancy grids integrating all proximity measurement data, where the mapped data from all the operated sensors is processed as described herein. In such an embodiment, the proximity measurements from each of the various sensors are all translated into a common reference frame.

Autonomous and/or advanced operator assistance (i.e., semi-autonomous) controls for improved vessel handling qualities requires placement of multiple proximity sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, a main inertial measurement unit (IMU) 36 is installed at a known location on the marine vessel with respect to a predefined point of navigation, such as the center of rotation (COR) or center of gravity (COG). The installation orientation or the main IMU 36 is also known. The installation locations of the main IMU 36 and each proximity sensor 72-78 are established as part of a calibration procedure for the proximity sensing system.

Referencing the example in FIG. 1, the main IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the main IMU 36 and may also receive information from a GPS receiver 40 comprising part of a global positioning system (GPS). The GPS receiver 40 is located at a pre-selected fixed position on the vessel 10, which provides information related to global position of the marine vessel 10. The main IMU 36 is also located at a known and fixed position with respect to the center of navigation determined for the marine vessel 10, such as the COR or COG.

In FIG. 1 an IMU 62-68 is co-located with each proximity sensor 72-78. These sensor IMUs 62-68 may be configured similarly to the main IMU, such as each comprising a rate gyro, an accelerometer, and a magnetometer and producing corresponding IMU data. The IMU data from each sensor IMU 62-68 may be used for various purposes, such as for automatic calibration and verification of the proximity sensor system, for angular measurements used to interpret the proximity measurements by the relevant proximity sensor 72-78, and/or as backup IMUs in case of fault or failure of the main IMU 36.

The inventors have recognized that sensing suites on autonomous vehicles produce large amounts of proximity measurement data, and that such large data amounts are impractical for implementing proximity sensor systems that run on an embedded controller and/or utilize bandwidth-limited networks, such as CAN buses. The inventors further recognize that existing solutions in the autonomy field for filtering data and performing prioritization calculations are insufficient or inappropriate for implementation on embedded controllers within existing marine vessel control architectures. In robotics, for example, complex geometric calculations are performed on proximity measurement data in order to navigate around obstacles and in certain applications, to properly control individual segments of the robot so that they do not collide with obstacles or each other. These complex geometric calculations typically implement one or more detailed three-dimensional models of the mobile robot, and the calculations are performed on powerful computers. Minimal effort has been made toward reducing computational loads while still providing precision control, especially for autonomous or semi-autonomous navigation in marine environments.

The inventors have recognized that in order to develop a proximity sensing system that operates on embedded control modules and within existing vessel control systems, improved systems and methods are needed that parse voluminous proximity measurement data streams into a form that is both able to be implemented in an embedded controller and maintains compatibility with a navigation controller. In view of the above-described challenges and inadequacies with current proximity sensing systems for autonomous and semi-autonomous vehicle control, the inventors developed the disclosed method and system that is tailored to proximity sensing within a marine environment and implementation of proximity sensor systems within existing marine vessel control architectures and networks. The disclosed solution utilizes a simplified two-dimensional representation of the vessel—a two-dimensional vessel outline—that is easily calibrated for a specific boat size and shape in order to calculate proximity of objects to the marine vessel and to prioritize data accordingly.

Figure 2:
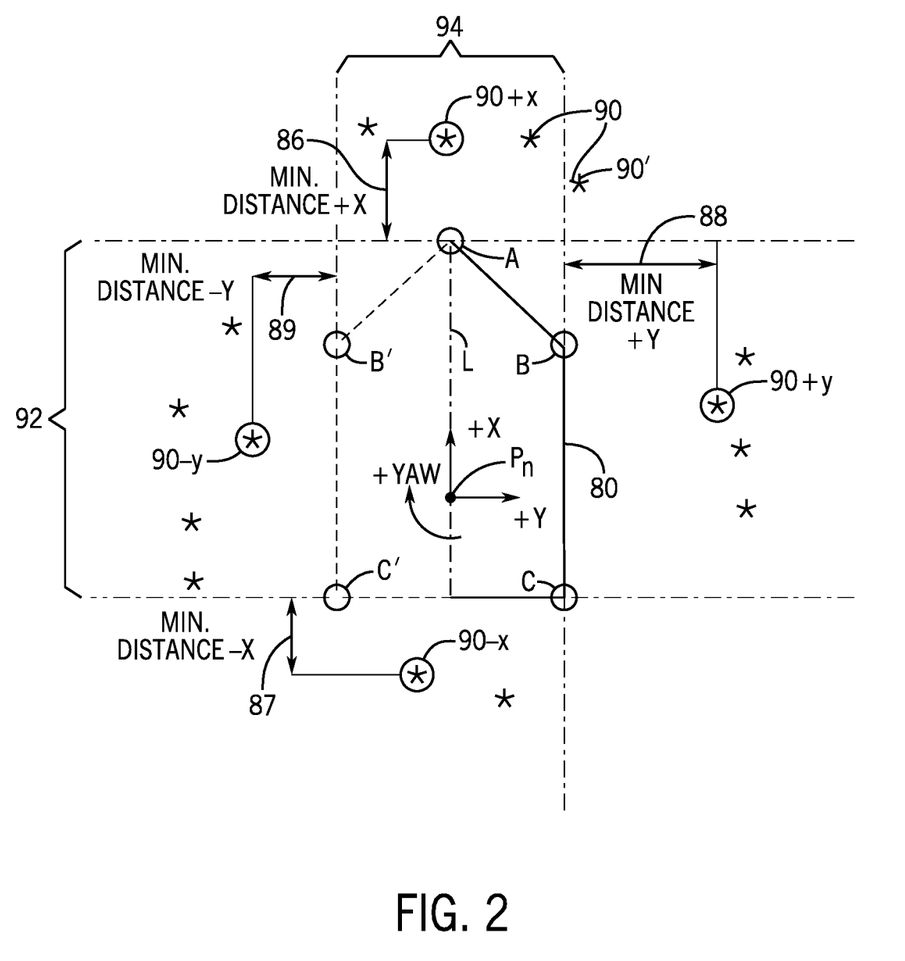
FIG. 2 is a diagram illustrating an exemplary calculation of most important object (MIO) dataset using a two-dimensional vessel outline according to the present disclosure.

The two-dimensional vessel outline may be, for example, a set of Cartesian points defined with respect to a point of navigation $P_n$. For instance, the two-dimensional vessel outline may be a set of five points forming the shape of a pentagon around $P_n$, where the center point (00) is the navigation point $P_n$ (i.e., the center of navigation) of the marine vessel. In one embodiment, the two-dimensional vessel outline 80 is calibratable to approximate any boat size and shape using just three Cartesian points. Referring to FIG. 2, the three Cartesian points include the front point A, starboard corner point B, and starboard back point C. Symmetry with respect to longitudinal line L is assumed, and thus the full vessel model can be automatically generated based on the three inputted points by defining the port corner point B' based on the starboard corner point B as having the same X-coordinate value and a negatively transposed Y-coordinate value. The port back point C' of the two-dimensional vessel outline 80 can be similarly defined based on the starboard back point C. A person having ordinary skill in the art will understand in light of this disclosure that the two-dimensional vessel outline may instead be calibrated by a user inputting the port-side points, which can then be transposed to create the starboard-side points. A person having ordinary skill in the art will also understand in light of this disclosure that the two-dimensional vessel outline may be comprised of more points and may have a shape other than a pentagon. Similarly, it will be further understood in light of the present disclosure that the vessel outline may be defined with respect to a different coordinate system, such as polar, cylindrical, or spherical coordinate systems.

This two-dimensional vessel outline forms the basis of low-processor-demand filtering and geometric calculations in order to generate a most important object (MIO) dataset identifying a select set of closest proximity measurements. For example, the MIO dataset may identify distances in each of the six directions that a boat has control authority—+/−X, +/−Y, and +/−yaw directions—thereby informing the navigation controller of the navigation constraints based on the location of objects O around the marine vessel and the vessel geometry, as determined based on the two-dimensional vessel outline. The navigation controller then utilizes the MIO dataset to calculate vessel navigation instructions and/ or to determine limitations on user control authority over vessel propulsion.

The disclosed methods and systems differ from prior art proximity sensing solutions by reducing the complexity of the MIO calculations and intelligently filtering the proximity measurement data using geometric assumptions in order to reduce the number of proximity measurements that are assessed and reduce the required calculations for assessing each point of interest. The disclosed system and method can be implemented using real-time microcontrollers, and thus can be implemented to add autonomous capability to existing navigation control systems. The MIO dataset is calculated using the simplified boat profile and low-computation-load geometry, as described further below, to generate the MIO dataset identifying the closest proximity measurements in each direction of movement of the marine vessel 10. In one embodiment, the MIO dataset includes six values specifying one closest proximity measurement in each of the +/−X directions, +/−Y directions, and +/−yaw rotational directions.

In certain embodiments, the MIO dataset may always contain six values defining the closest proximity measurements in each of the aforementioned directions of movement. Thus, if no proximity measurements are detected in a particular direction, then a default large number may be provided to the navigation controller, which will be interpreted as non-limiting in the respective direction. To provide just one example, the default distance in the +/−yaw direction may be +/−180°. The navigation controller will interpret that default large rotation angle range to mean that the vessel can turn 180° without colliding with any object in the yaw direction. In other embodiments, the default large number may be greater than 180° (even as large as 360°), or may be smaller than 180°, such as 90°. The default large value in the X and Y directions may be a Y-value, such as 10,000 meters, 50,000 meters, or more. In any such case, the default distance is large enough that the navigation controller will not limit any vessel movement based on the relevant default MIO data point. In other embodiments, the system 20 may be configured such that less than six numbers may be provided for the MIO dataset. Thus, where no proximity measurements 90 are detected in a particular direction, a null or no value may be reported as part of the MIO dataset.

FIG. 2 depicts an example where the two-dimensional vessel outline 80 is presented with respect to multiple proximity measurements 90. The four linearly-closest proximity measurements $90_{+x}$, $90_{-x}$, $90_{+y}$, and $90_{-y}$ are determined as the four closest proximity measurements in each direction along the X-axis and the Y-axis, sequentially. Namely, the proximity measurement with the minimum distance 86 in the +X direction from the front-most point of the vessel model, the front point A, is determined as the closest proximity measurement $90_{+x}$. The proximity measurement 90 with the minimum distance 87 in the −X direction as measured along the X-axis from the X-value of the back points C and C' is the closest proximity measurement $90_{-x}$. The proximity measurement 90 with the minimum distance 88 in along the Y-axis from the Y-value of starboard points B and C is the closest proximity measurement $90_{+y}$. The minimum distance 89 in the direction of the negative Y-axis from the Y-values of the port points B' and C' is the closest proximity measurement $90_{-y}$.

Prior to calculating the four linearly-closest proximity measurements $90_{+x}$, $90_{+y}$, a filtration step may be performed to eliminate values that are outside of a region of interest defined by the vessel profile. In other words, the proximity measurement data may first be filtered to eliminate proximity measurements that would not intersect with the marine vessel if the marine vessel were to move horizontally in either direction (in the +/−Y directions) or in the fore/aft directions (in the +/−X directions). In the example at FIG. 2, a horizontal region of interest 92 is defined based on minimum and maximum X-values of the Cartesian points comprising the two-dimensional vessel outline 80. This represents the area that would be occupied by the vessel were it to move exactly laterally in either of the +Y direction or the −Y direction. Specifically, the horizontal region of interest 92 is defined by the X-value of the front point A and the X-value of the back point C, C'. Any proximity measurement with an X-value outside of this range can be eliminated. Similarly, a four/aft region of interest 94 can be defined to identify the area directly in front or directly behind the marine vessel. The fore/aft region of interest 94 is defined by the +Y-values of the starboard corner point B and back corner point C (which in the depicted embodiment are equal) and the −Y-values of the port corner point B' and the port back point C' (which are also equal in the depicted embodiment). Thus, any proximity measurement 90 having a Y-value outside of that +/−Y range can be eliminated from the dataset of potential closest proximity measurements. In the example of FIG. 2, proximity measurement 90' is not within either of the horizontal region of interest 92 or the fore/aft region of interest 94, and thus is eliminated from the analyzed dataset, even though the distance in the +X direction between the front point A and proximity measurement 90' is actually less than the distance 86 to the proximity measurement $90_{+x}$.

In addition to the linearly-closest proximity measurements, rotationally-closest proximity measurements may also be calculated, which are the closest proximity measurements in the +yaw direction and the −yaw direction. In other words, the rotationally-closest proximity measurements include the point that will first touch the two-dimensional vessel outline 80 as it rotates about the point of navigation $P_n$ in the +yaw direction (clockwise) and the point that will first touch the two-dimensional vessel outline 80 as it rotates about $P_n$ in the −yaw direction (counterclockwise). The two rotationally-closest proximity measurements are used to identify the yaw angles to which the marine vessel can rotate without colliding with an object. The smallest +yaw angle and smallest −yaw angle may be included in the MIO dataset so that the vessel navigation controller can properly limit the movement of the marine vessel so as to avoid collision.

Figure 3:
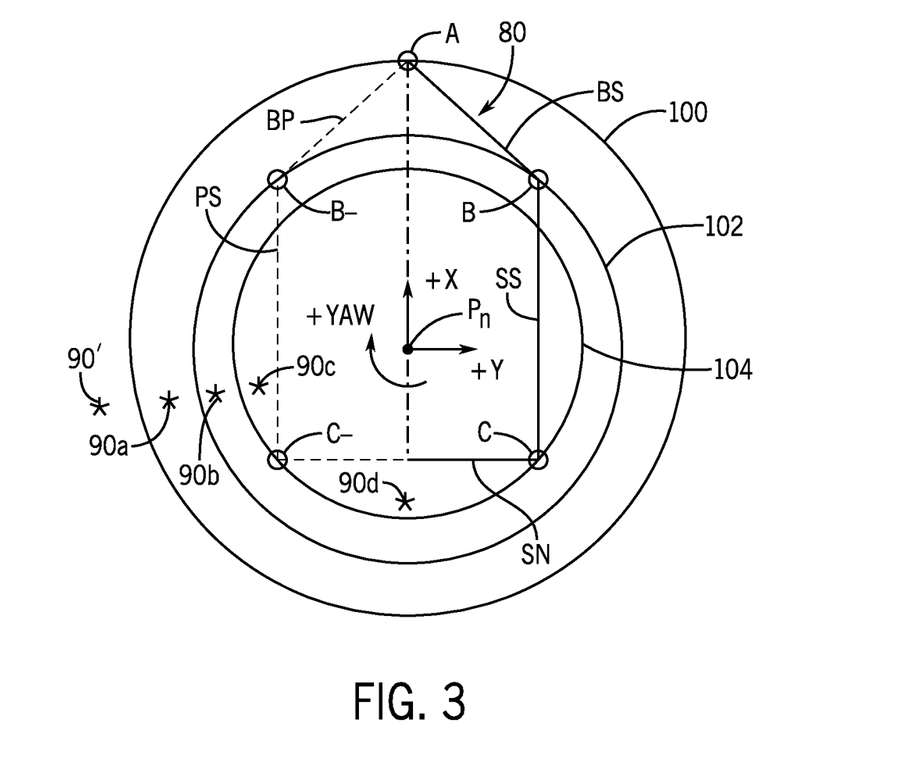
FIG. 3 depicts a two-dimensional vessel outline and exemplary yaw circles for reducing the calculation load for determining the rotationally-closest proximity measurements for the MIO dataset according to the present disclosure.

Geometric functions for calculating yaw paths and yaw angles tend to be processor-intensive, such as arctan and arctan 2 functions. Thus, the inventors developed methods for determining positive and negative yaw distances that limit the use of those functions and that limit the computational loads of the yaw calculations. Various methods are described herein for doing so which involve defining one or more yaw circles 100, 102, 104 with respect to the two-dimensional vessel outline 80. An outer yaw circle 100 is defined as a circle having a radius between the point of navigation $P_n$ and the front point A of the two-dimensional vessel outline 80. Any proximity measurement 90' outside of the outer yaw circle 100 will not be in the yaw path of the vessel, and thus can be eliminated from the dataset before calculating yaw angles to identify the two rotationally-closest proximity measurements. For those values within the outer yaw circle 100, at least one yaw path will be calculated between the respective proximity measurement and one or more intersection points on the two-dimensional vessel outline 80. Referring to FIG. 3, one or more yaw paths will be calculated for each of the proximity points 90a, 90b, and 90c. For each yaw path determined for each proximity measurement 90, a +yaw angle or a −yaw angle is determined (depending on the path of rotation), and the smallest positive and negative yaw angles are included in the MIO dataset.

Differing yaw path and yaw angle calculation methods may be utilized depending on the location of the proximity measurement 90a-90c. In one embodiment, a second yaw circle, an inner yaw circle 102, is defined based on the radius between the point of navigation $P_n$ and the corner points B, B' of the two-dimensional vessel outline 80. Points inside of the inner yaw circle 102 (e.g. 90b and 90c) will intersect with at least one of the sides of the marine vessel during the positive and/or negative yaw rotation, where the side of the marine vessel is defined as the line between each corner point B, B' and the respective back point C, C'—starboard side line SS and port side line PS. Alternatively, the point within the inner yaw circle could collide with the stern of the marine vessel, represented as line SN between the two back points C, C'. For proximity measurements between the inner and outer yaw circles (i.e., outside of the inner yaw circle 102 but inside the outer yaw circle 100), calculations are performed to determine the yaw distance between the proximity measurement and the bow of the marine vessel, represented in the example by starboard bow line BS between the front point A and the starboard corner point B and the port bow line BP between the front point A and the port corner point B'.

In certain embodiments, a rear yaw circle 104 may also be defined, which is a circle having a radius between the point of navigation $P_n$ and the back points C, C' of the two-dimensional vessel outline 80. Proximity measurements (e.g. 90c and 90d) falling within the rear yaw circle 104 will each have a +yaw angle and a −yaw angle having a magnitude less than 180°. Thus, the system may be configured to ensure that both positive and negative yaw angles are calculated for each proximity measurement 90c, 90d within the rear yaw circle 104, and that only one positive or negative yaw angle (i.e. whichever one is less than 180°) is calculated for those proximity measurements between the rear yaw circle 104 and the outer yaw circle 100.

Figure 4:
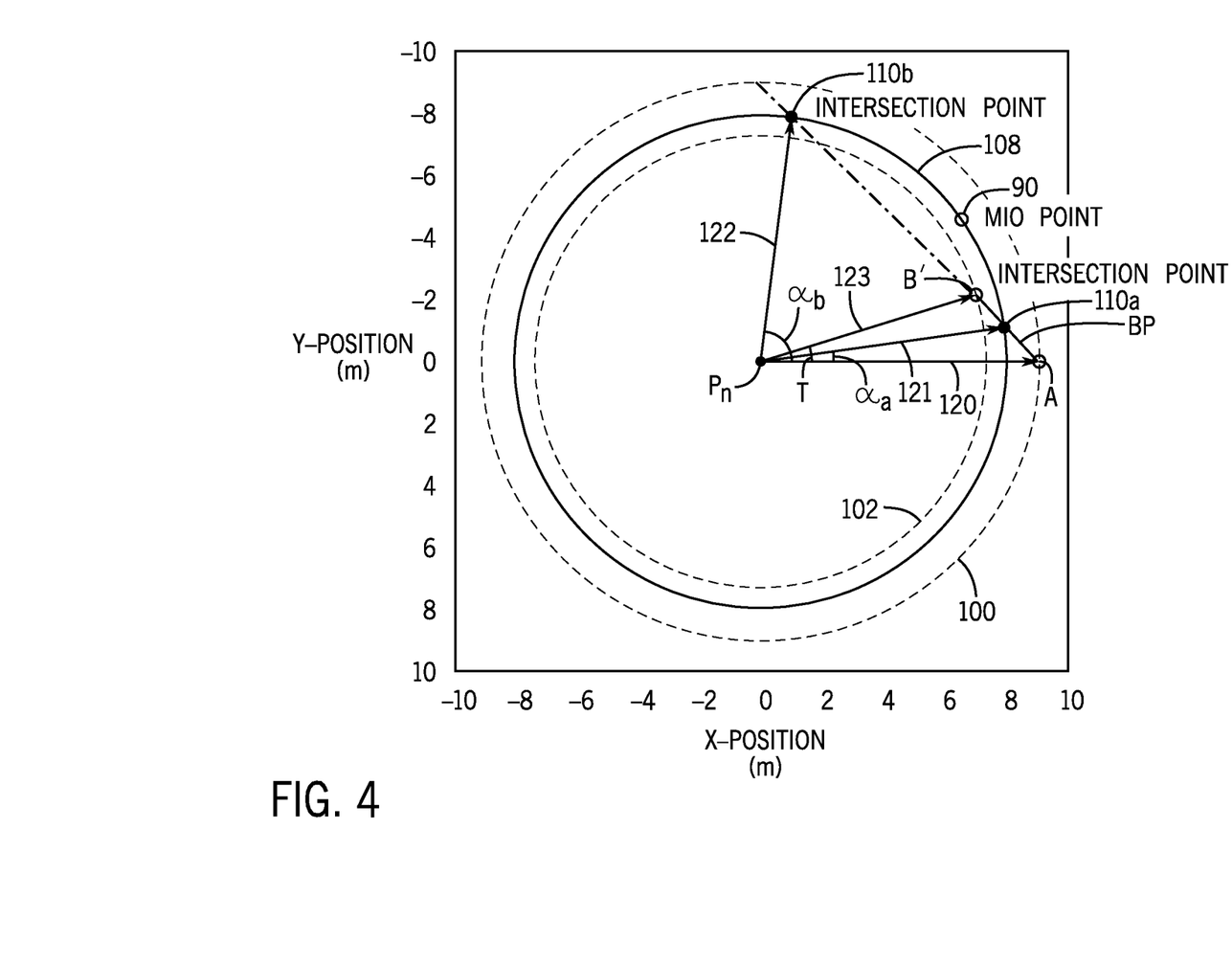
FIG. 4 is another diagram showing an exemplary implementation of yaw circles for calculating the MIO dataset according to the present disclosure.

For calculating the yaw path for each proximity measurement 90, a circle may be defined having a radius between the point of navigation $P_n$ and the proximity measurement 90. FIG. 4 represents one such calculation, where the proximity measurement circle 108 is defined for calculating the yaw path for a proximity point 90. At least one intersection point is identified between the proximity measurement circle (e.g., 108) and the two-dimensional vessel outline 80. The line for which the intersection is determined may be identified based on the X and Y-values of the proximity measurement 90. For example, if the proximity measurement 90 has a positive Y-value and an X-value that is greater than the X-coordinate value of the rear point C, then the system will assess intersection with one of the starboard-side lines SS or BS. Namely, if the proximity point is within the inner yaw circle 102, then intersection with the SS line will be assessed; if the proximity point 90 is between the inner yaw circle 102 and the outer yaw circle 100, then intersection with the BS line will be assessed. The same logic holds for values on the port-side. For proximity measurements 90 having an X-value that is less than (i.e., more negative than) the X coordinates of the rear points C, C', then an initial assessment may determine whether the proximity point 90 is within the rear yaw circle 104. If so, then the intersection will be assessed with respect to the stern of the marine vessel, line SN. If the proximity point 90 is outside of the rear yaw circle 104, then intersection with the starboard and/or port side or bowlines will be assessed, depending on the location of the proximity measurement.

FIG. 4 depicts one exemplary method for calculating yaw angle for proximity points 90 between the outer yaw circle 100 and the inner yaw circle 102. Proximity measurement circle 108 is drawn based on the radius between the proximity measurement 90 and the point of navigation $P_n$. Since the proximity measurement 90 has a negative Y-value, intersection with the port-side lines of the two-dimensional vessel outline 80 is assessed, and specifically intersection with the port bow line BP, given that the measurement point 90 is between the inner and outer yaw circles 102, 100. In certain embodiments, functions for determining the intersect between a circle and a line will assume that line BP is a continuous line defined by Cartesian points A and B', and thus will return two intersection points (e.g., 110a and 110b). Only one of the intersection points is on the relevant bow line BP (or BS if on the other side of the vessel outline 80). In the depicted example, intersection point 110a is the real intersection point and intersection point 110b is an erroneous artifact of the calculation (i.e., the mathematical assumption that line BP is a continuous line).

In one embodiment, differentiation between the real intersection point 110a and the erroneous intersection point 110b is performed by determining whether the corresponding yaw angle is within a threshold angle range defined by port bow line BP. A zero line 120 is defined between the point of navigation $P_n$ and the front point A of the two-dimensional vessel outline 80. A first line 121 between the point of navigation $P_n$ and the first intersect 110a is determined, and then a first angle $\alpha_a$ is identified between the zero line 120 and the first line 121. Similarly, a second line 122 between the point of navigation $P_n$ and the second intersect 110b is determined, and then the angle $\alpha_b$ between the second line 122 and the zero line 120 is determined. An angle threshold range T is determined as the angle between the zero line 120 and a third line 123 between the point of navigation $P_n$ and the port corner point B'. The relevant yaw angle for the real intersection point 110a or 110b—i.e., between the first angle $\alpha_a$ and the second angle $\alpha_b$—is the one that is less than the angle threshold T. Thus, $\alpha_a$ is the yaw angle, and specifically the negative yaw angle, that gets added to the MIO dataset.

Figure 5A:
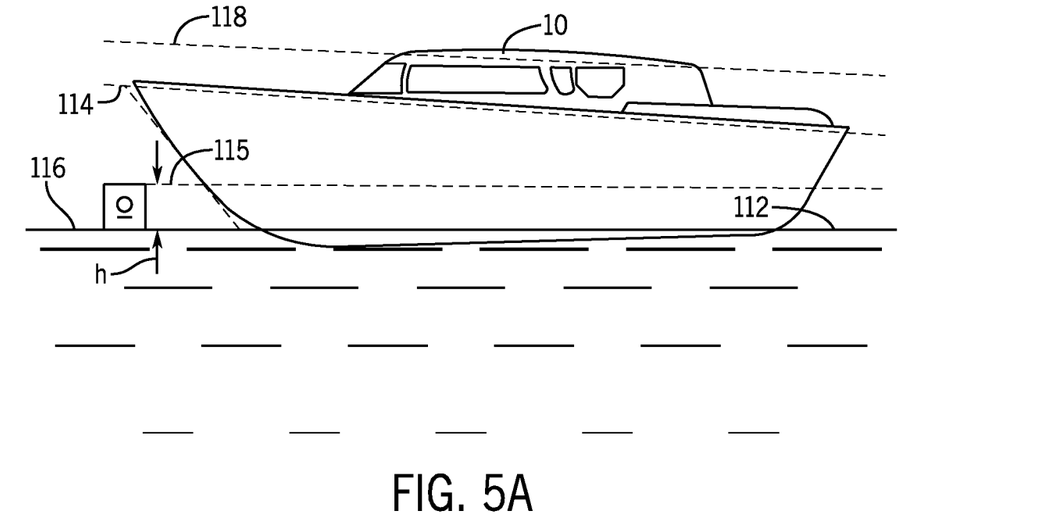
FIGS. 5A and 5B are diagrams illustrating exemplary vessel cross-sections and corresponding two-dimensional vessel outlines.
Figure 5B:
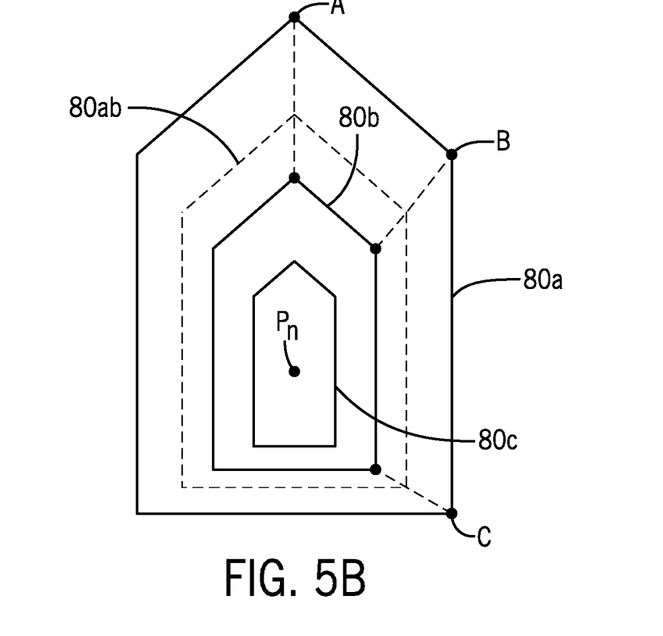

In certain embodiments, two or more two-dimensional vessel outlines 80 may be defined for a marine vessel 10 describing the vessel hull at various heights with respect to the point of navigation $P_n$. Where just one two-dimensional vessel profile is used, it will typically account for the largest dimensions of the marine vessel hull. However, some hulls may vary greatly in width and length from top to bottom. For example, most marine vessels are wider at the rub rail than at the waterline, and some vessels are wider at the rub rail but narrow at the level of the flybridge. Thus, multiple two-dimensional vessel outlines 80 may be defined, each approximating a cross-section of the marine vessel at a particular height. FIG. 5A depicts one example where the vessel is significantly wider and longer at the rub rail than at the area of the waterline. Accordingly, two-dimensional vessel outlines may be defined describing various cross-sections of the vessel 10, including a rub rail cross-section 114, a waterline cross-section 116, and a top cross-section 118. In other embodiments, more or fewer cross-sections may be defined. As illustrated in FIG. 5B, a first two-dimensional vessel outline 80a is then defined approximating the rub rail cross-section 114 and a second two-dimensional vessel outline 80b may be defined approximating the waterline cross-section 116. In certain embodiments, a third two-dimensional vessel outline 80c may also be defined approximating the top cross-section 118 of the vessel, such as the dimensions of the flybridge.

An appropriate vessel model may then be selected for each proximity measurement based on a height of the measured object O. Thereby, more precise proximity values can be calculated. In certain embodiments, this may be done for a closest subset of the proximity measurements, such as the six or more proximity measurements that are contenders for inclusion in the MIO dataset. For each such proximity measurement 90, an object height h may also be determined and processed representing the height of the object O described by the respective proximity measurement 90 (which will be in addition to the distance and direction described above).

An appropriate two-dimensional vessel model may then be selected based on the object height h. In the depicted example where two-dimensional vessel outlines 80a, 80b, 80c are defined for the largest and smallest cross-sections, interpolation between the outlines may be performed to calculate the appropriate vessel outline at the object height h. Referring again to FIG. 5A, cross-sectional line 115 may be defined based on the height of the object h relative to the waterline 112. Thus, an intersection point between the vessel outlines 80a and 80b is computed, such as along lines defined between the points A, B, C of each outline 80a and 80b. Thereby, and interpolated vessel outline 80ab can be defined approximating the profile of the marine vessel 10 at the relevant object height h. This interpolated vessel outline 80ab will be utilized as the appropriate two-dimensional vessel model with which the closest proximity determinations are made for the MIO dataset.

In another embodiment, a closest one of the two-dimensional vessel outlines (e.g., 80a, 80b, or 80c) defined for the marine vessel 10 may be identified based on the object height h, and the identified closest outline will be used for the MIO dataset calculations. In such an embodiment, multiple vessel outlines 80 may be defined between the widest/longest section of the marine vessel and the waterline 112. For each vessel outline 80, a height threshold range may be defined describing a range of object heights to which the vessel outline 80 applies. The appropriate two-dimensional vessel outline 80 may then be selected as that having the height threshold range that pertains to the object height h.

The MIO identification is executed by one or more controllers with the control system 20. Referring again to FIG. 1, the sensor processor 70 receives the proximity measurement from each of the proximity sensors 72-78, and in such an embodiment may be configured with software to perform the MIO dataset identification as described herein. The sensor processor 70 may also be configured to filter the proximity measurement data prior to identifying the MIO dataset, and provide the MIO dataset to a controller performing the navigation, such as the central controller 24. Thus, the sensor processor 70 may be a dedicated, special-purpose computing system configured to process the proximity measurement data from the proximity sensors 72-78. The sensor processor 70 may include its own storage system comprising memory and its own processing system that executes programs and accesses data stored in the memory of the sensor processor 70. For example, the sensor processor 70 may store one or more MIO identification software modules comprising computer-executable instructions to perform the MIO identification as described herein.

Given the large amount of proximity data produced by the proximity sensors 72-78, the connection between the sensors 72-78 and the sensor processor 70 may be via a dedicated bus or network connection. This dedicated bus or network connection is separate from the vessel network in order to allow transmission of a large amount of proximity measurement data (and, in some embodiments, IMU data) to the sensor processor 70. Such massive data transmission may not be possible on a typical vessel network, such as a CAN bus or wireless network where multiple devices are communicating. The sensor processor 70 may be configured to communicate the filtered data on the vessel network, such as a CAN bus or wireless network, since the zone-filtered dataset is a much smaller and more manageable amount of data. In still other embodiments, a dedicated communication link may be provided between the sensor processor 70 and the navigation controller, such as the central controller 24.

Figure 6:
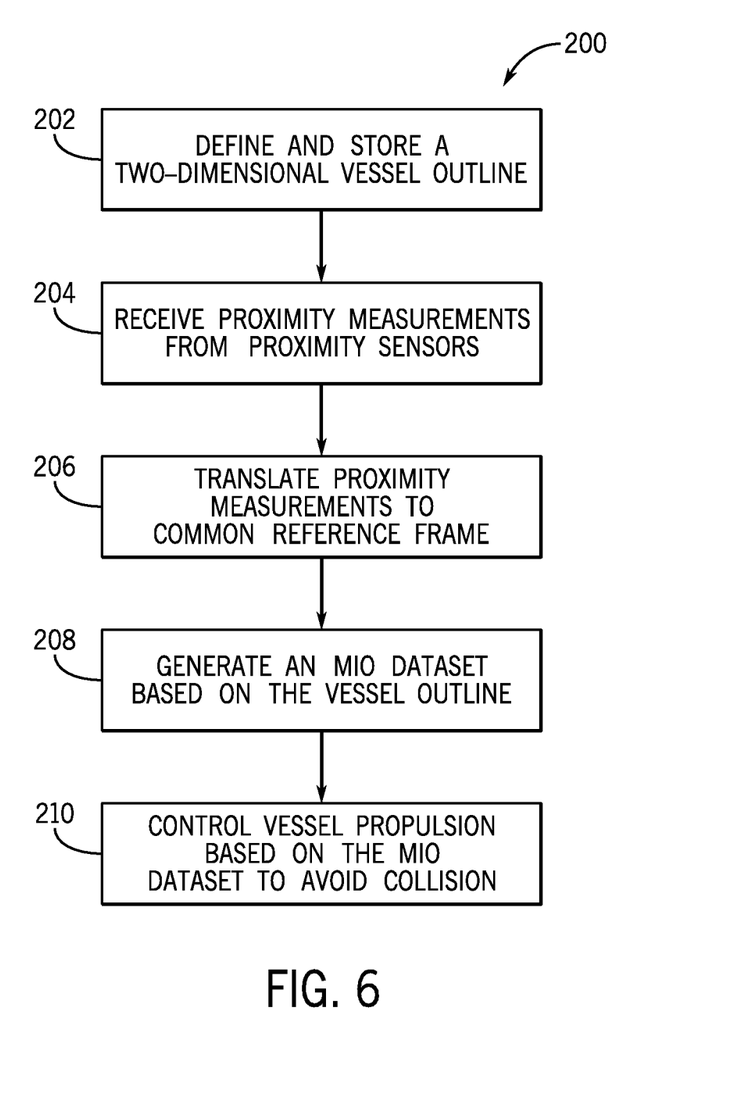
FIGS. 6 and 7 are flow charts illustrating embodiments of methods of operating a proximity sensor system on a marine vessel.
Figure 7:
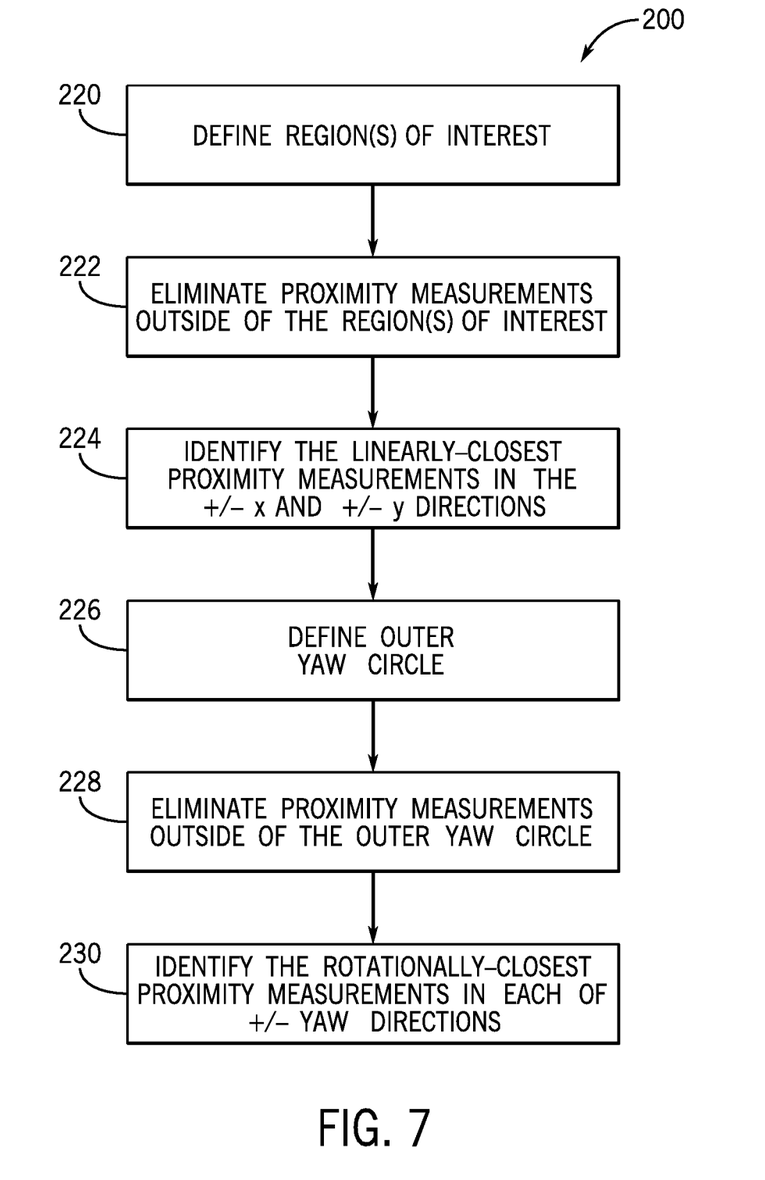

FIGS. 6 and 7 present embodiments, or portions thereof, of a method 200 of operating a proximity sensor system on a marine vessel. In FIG. 6, the method 200 of operating a proximity sensor system begins by defining and storing a two-dimensional vessel outline at step 202. As described herein, for example, the two-dimensional vessel outline may include a set of Cartesian points defined with respect to the point of navigation for the marine vessel. In certain embodiments, multiple two-dimensional vessel outlines may be defined to represent the vessel hull at different heights with respect to the water line. Proximity measurements are received at step 204 from one or more proximity sensors, which as described herein may be radar sensors, lidar, Leddar, sonar, or camera sensors may be used, including combinations thereof, to provide proximity information which is then processed as described herein. The proximity measurements from each of the one or more proximity sensors, which again may include various types of sensors, are all translated to a common reference frame at step 206. For example, the common reference frame may be defined with respect to the point of navigation for the marine vessel.

The MIO data set is then identified as step 208 by comparing the proximity measurements to the appropriate two-dimensional vessel outline. As described herein, the MIO data set may include the four linearly-closest points and/or the two rotationally-closest proximity measurements identified based on the two-dimensional vessel outline. The MIO data set is then utilized at step 210, such as by a navigation controller for the marine vessel 10, to control propulsion of the marine vessel to avoid collision with any object detected by the proximity sensors. In context of autonomous vessel guidance, the guidance controller may calculate and control propulsion devices (e.g. 12a and 12b) to autonomously move the marine vessel 10 between predefined locations. Alternatively or additionally, the MIO data set may be utilized by the navigation controller to limit user authority over vessel propulsion, such as to prevent the marine vessel 10 from colliding with a detected object.

FIG. 7 depicts steps of the method 200 representing one embodiment of MIO dataset calculation. Regions of interest are defined at step 220, such as horizontal and four/aft regions of interest as described herein. Proximity measurements outside of the regions of interest are eliminated from consideration at step 222. The linearly-closest proximity measurements are then identified at step 224, including the closest proximity measurements in each of the positive and negative X and Y directions. Calculations steps are then performed to identify the rotationally-closest proximity measurements. In the depicted embodiment, an outer yaw circle is defined at step 226, which as described above in the examples at FIGS. 3 and 4, is the circle having a radius between the point of navigation and the front point A of the vessel outlines 80. All proximity measurements that are not within the outer yaw circle are then eliminated from consideration at step 228, thereby reducing the computational load. The rotationally-closest proximity measurements in each of the positive and negative yaw directions are then identified at step 230, where only the proximity measurements within the outer yaw circle are considered.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A proximity sensor system on a marine vessel, the system comprising:
one or more proximity sensors, each at a sensor location on the marine vessel and configured to measure proximity of objects and generate proximity measurements;
a memory storing a two-dimensional vessel outline of the marine vessel with respect to a point of navigation for the marine vessel;
a processor configured to:
receive the proximity measurements measured by the one or more proximity sensors on the marine vessel;
from the received proximity measurements, identify four linearly-closest proximity measurements based on the two-dimensional vessel outline, including one closest proximity measurement in each of a positive X direction, a negative X direction, a positive Y direction, and a negative Y direction;
generate a most important object (MIO) dataset identifying the four linearly-closest proximity measurements; and
wherein propulsion of the marine vessel is effectuated based at least in part on the MIO dataset.

2. The proximity sensor system of claim 1, wherein the one or more proximity sensors includes at least two proximity sensors, each at a different location on the marine vessel and imaging a different area around the marine vessel; and
wherein the processor is further configured to, before identifying the four linearly-closest proximity measurements, translate the proximity measurements to a common reference frame with respect to the point of navigation for the marine vessel.

3. The proximity sensor system of claim 1, wherein the two-dimensional vessel outline is a set of Cartesian points defined with respect to the point of navigation for the marine vessel.

4. The proximity sensor system of claim 1, wherein the processor is further configured to:
define a horizontal region of interest based on minimum and maximum X-values of the two-dimensional vessel outline;
define a fore/aft region of interest based on minimum and maximum Y-values of the two-dimensional vessel outline; and
before identifying the linearly-closest proximity measurements, eliminate proximity measurements that are not within at least one of the horizontal region of interest and the fore/aft region of interest.

5. The proximity sensor system of claim 1, wherein the processor is further configured to:
identify two rotationally-closest proximity measurements to the two-dimensional vessel outline, including a smallest positive yaw angle between one of the proximity measurements and an intersection point on a starboard side of the two-dimensional vessel outline and a smallest negative yaw angle between one of the proximity measurements and an intersection point on a port side of the two-dimensional vessel outline; and
wherein the most important object (MIO) dataset further includes the smallest positive yaw angle and a smallest negative yaw angle.

6. The proximity sensor system of claim 1, wherein the memory stores at least a second two-dimensional vessel outline of the marine vessel with respect to the point of navigation, wherein the second two-dimensional vessel outline represents a cross-section of the marine vessel closer to a waterline than the first two-dimensional vessel outline;
wherein the processor is further configured to:
identify an object height for at least a closest subset of the proximity measurements;
determine an appropriate two-dimensional vessel outline for each of the closest subset of proximity measurements based on the respective object height; and
identify the four linearly-closest proximity measurements based on the appropriate two-dimensional vessel outlines for each.

7. A method of operating a proximity sensor system on a marine vessel, the method comprising:
defining a two-dimensional vessel outline of the marine vessel with respect to a point of navigation for the marine vessel;
storing the two-dimensional vessel outline of the marine vessel in a memory accessible to a processor;
receiving, at the processor, proximity measurements measured by one or more proximity sensors on the marine vessel;
translating, with the processor, the proximity measurements to a common reference frame with respect to the point of navigation for the marine vessel;
identifying from the received proximity measurements, with the processor, four linearly-closest proximity measurements to the two-dimensional vessel outline, including one closest proximity measurement in each of a positive X direction, a negative X direction, a positive Y direction, and a negative Y direction; and
generating, with the processor, a most important object (MIO) dataset identifying the four linearly-closest proximity measurements.

8. The method of claim 7, wherein the two-dimensional vessel outline is a set of points defined with respect to the point of navigation for the marine vessel.

9. The method of claim 8, wherein the two-dimensional vessel outline includes Cartesian points forming a pentagon and defined with respect to the point of navigation, including a front point, a starboard corner point and a port corner point, and a starboard back point and a port back point.

10. The method of claim 7, further comprising:
defining, with the processor, a horizontal region of interest based on minimum and maximum X-values of the two-dimensional vessel outline;
defining, with the processor, a fore/aft region of interest based on minimum and maximum Y-values of the two-dimensional vessel outline; and
before identifying the linearly-closest proximity measurements, eliminating proximity measurements that are not within at least one of the horizontal region of interest and the fore/aft region of interest.

11. The method of claim 7, further comprising:
identifying, with the processor, two rotationally-closest proximity measurements to the two-dimensional vessel outline, including a smallest positive yaw angle between one of the proximity measurements and an intersection point on a starboard side of the two-dimensional vessel outline and a smallest negative yaw angle between one of the proximity measurements and an intersection point on a port side of the two-dimensional vessel outline; and
wherein the most important object (MIO) dataset further includes the smallest positive yaw angle and a smallest negative yaw angle.

12. The method of claim 11, further comprising:
defining, with the processor, an outer yaw circle as a circle having a radius between the point of navigation and a front point of the two-dimensional vessel outline; and
eliminating, with the processor, proximity measurements that are with within the outer yaw circle prior to calculating yaw angles to identify the two rotationally-closest proximity measurements.

13. The method of claim 12, further comprising:
calculating, with the processor, at least one yaw path between each proximity measurement inside the outer yaw circle and a respective intersection point on the two-dimensional vessel outline;
calculating, with the processor, a positive yaw angle or a negative yaw angle based on the respective yaw path for each proximity measurement inside the outer yaw circle; and
identifying, with the processor, the smallest positive yaw angle as a smallest one of the positive yaw angles and identifying the smallest negative yaw angle as a smallest one of the negative yaw angles.

14. The method of claim 13, wherein the two-dimensional vessel outline includes Cartesian points forming a pentagon and defined with respect to the point of navigation, including the front point, a starboard corner point and a port corner point, and a starboard back point and a port back point.

15. The method of claim 14, further comprising:
defining, with the processor, an inner yaw circle as a circle having a radius between the point of navigation and the corner points of the two-dimensional vessel outline;
defining, with the processor, a starboard bow line intersecting the front point and the starboard corner point and a port bow line intersecting the front point and the starboard corner point;
for each proximity measurement between the outer yaw circle and the inner yaw circle:
defining, with the processor, a proximity measurement circle having a radius between the point of navigation and the proximity measurement;
determining, with the processor, at least one of a starboard intersection point where the proximity measurement circle intersects the starboard bow line and a port intersection point where the proximity measurement circle intersects the port bow line; and
determining, with the processor, the positive yaw angle based on the starboard intersection point and the negative yaw angle based on the port intersection point.

16. The method of claim 15, wherein determining the starboard intersection point further includes:

determining two intersects, including a first intersect and a second intersect, between the proximity measurement circle and the starboard bow line;

defining a zero line between the point of navigation and the front point;

defining a first line between the point of navigation and the first intersect, and determining a first angle between the zero line and the first line;

defining a second line between the point of navigation and the second intersect, and determining a second angle between the zero line and the second line;

defining a third line between the point of navigation and the starboard corner point, and determining an angle threshold range between the zero line and the third line; and if the first angle is within the angle threshold range, then the first intersect is the starboard intersection point, or if the second angle is within the angle threshold range, then the second intersect is the starboard intersection point.

17. The method of claim 15, further comprising:

defining a rear yaw circle as a circle having a radius between the point of navigation and the back points of the two-dimensional vessel outline; and for each proximity measurement inside both the inner yaw circle and rear yaw circle, calculating both a positive yaw angle and a negative yaw angle.

18. The method of claim 7, further comprising:

defining, with the processor, at least a second two-dimensional vessel outline of the marine vessel with respect to the point of navigation, wherein the second two-dimensional vessel outline represents a cross-section of the marine vessel closer to a waterline than the first two-dimensional vessel outline;

identifying, with the processor, an object height for at least a closest subset of the proximity measurements;

determining, with the processor, an appropriate two-dimensional vessel outline for each of the closest subset of proximity measurements based on the respective object height; and identifying, with the processor, the four linearly-closest proximity measurements based on the appropriate two-dimensional vessel outlines for each.

19. The method of claim 18, wherein the first two-dimensional vessel outline represents a largest cross-section of the marine vessel and the second two-dimensional vessel outline represents a cross-section of the marine vessel at the waterline; and wherein determining the appropriate two-dimensional vessel outline includes interpolating between the first two-dimensional vessel outline and the second two-dimensional vessel outline based on the object height.

20. The method of claim 18, wherein each of the at least two two-dimensional vessel outlines has a height threshold range associated therewith; and wherein determining the appropriate two-dimensional vessel outline includes determining which associated height threshold range for the at least two two-dimensional vessel outlines pertains to the object height.

* * * * *